United States Patent
Wang et al.

(10) Patent No.: US 11,985,261 B2
(45) Date of Patent: May 14, 2024

(54) SOFTWARE PUF BASED ON RISC-V PROCESSOR FOR IOT SECURITY

(71) Applicant: Wenzhou University, Zhejiang (CN)

(72) Inventors: Pengjun Wang, Zhejiang (CN); Li Ni, Zhejiang (CN); Yue Jun Zhang, Zhejiang (CN); Di Zhou, Zhejiang (CN); Yijian Shi, Zhejiang (CN)

(73) Assignee: Wenzhou University, Zhejiang (CN)

( * ) Notice: Subject to any disclaimer, the term of this patent is extended or adjusted under 35 U.S.C. 154(b) by 122 days.

(21) Appl. No.: 17/900,848

(22) Filed: Aug. 31, 2022

(65) Prior Publication Data

US 2023/0224171 A1 Jul. 13, 2023

(30) Foreign Application Priority Data

Jan. 10, 2022 (CN) .......................... 202210021469.8

(51) Int. Cl.
*H04L 9/32* (2006.01)
*G06F 21/56* (2013.01)

(52) U.S. Cl.
CPC .................................. *H04L 9/3278* (2013.01)

(58) Field of Classification Search
CPC ...... G06F 21/566; G06F 21/577; G06F 21/73; G06F 2221/034; H04L 2209/08; H04L 2209/12; H04L 2209/26; H04L 9/002; H04L 9/3278; G09C 1/00
See application file for complete search history.

(56) References Cited

U.S. PATENT DOCUMENTS

| | | | | |
|---|---|---|---|---|
| 11,698,952 B2* | 7/2023 | Seo | ........................ | H04L 9/3231 |
| | | | | 713/186 |
| 2014/0126306 A1* | 5/2014 | Otterstedt | ............. | H04L 9/3263 |
| | | | | 365/189.07 |
| 2015/0006601 A1* | 1/2015 | Aissi | ................... | H04L 63/0428 |
| | | | | 708/250 |
| 2020/0186350 A1* | 6/2020 | Wentz | ................... | H04L 9/3247 |
| 2021/0091952 A1* | 3/2021 | Wentz | ................... | H04L 9/3278 |
| 2022/0038275 A1* | 2/2022 | Hwang | .................... | G06F 21/78 |
| 2022/0278856 A1* | 9/2022 | Mumcu | ................. | B33Y 10/00 |
| 2023/0023303 A1* | 1/2023 | Shah | ..................... | G06F 9/3836 |
| 2023/0224171 A1* | 7/2023 | Wang | ................... | H04L 9/3278 |
| | | | | 713/189 |

* cited by examiner

*Primary Examiner* — Gary S Gracia
(74) *Attorney, Agent, or Firm* — JCIPRNET

(57) ABSTRACT

Disclosed is a software PUF based on an RISC-V processor for IoT security. A 32-bit RISC-V processor is used to generate abnormal information results in an abnormal operating state under a low voltage, and the abnormal information results are used to represent the features of the 32-bit RISC-V processor; 5-bit binary data obtained by comparing the abnormal information results with normal information results has high randomness and uniqueness and it is extremely difficult to directly extract internal abnormal information result from a hardware circuit of the 32-bit RISC-V processor, so modeling attacks based on the 5-bit binary data calculated according to the abnormal information results of the 32-bit RISC-V processor are almost impossible; in addition, when the 32-bit RISC-V processor is in an abnormal operating state, the operating frequency of the 32-bit RISC-V processor is dynamically adjusted through a frequency compensation method.

2 Claims, 3 Drawing Sheets

SOFTWARE PUF BASED ON RISC-V PROCESSOR FOR IOT SECURITY

CROSS-REFERENCE TO RELATED APPLICATION

This application claims the priority benefit of China application serial no. 202210021469.8, filed on Jan. 10, 2022. The entirety of the above-mentioned patent application is hereby incorporated by reference herein and made a part of this specification.

BACKGROUND OF THE INVENTION

1. Technical Field

The invention relates to a software PUF, in particular to a software PUF based on an RISC-V processor for IoT security.

2. Description of Related Art

With the continuous increase of the number of interconnected remote embedded devices on the basic architecture of IoT, IoT can make a great contribution to social and economic development like Internet, but it also faces various security threats. As reported by the Kaspersky lab, over 105,000,000 IoT attacks from 279,000 abnormal IP addresses are detected in the first half of 2019. Most existing IoT security systems require high implementation and post-maintenance costs. Unpredictable CRPs generated by PUF, as a lightweight security primitive, make it possible to solve security problems of extremely resource-limited IoT platforms.

Traditional PUFs generate random, unique and tamper-proof output responses (feature keys) by means of an exclusive circuit structure, and such PUFs that generate output responses by means of a hardware circuit structure are called hardware PUFs. At present, typical hardware PUFs include arbiter PUFs (APUFs) and ring-oscillator PUFs (RO PUFs). Lim et al. constructed an APUF circuit by means of delay changes of wires and transistors, and added nonlinear elements to signal paths to enhance the model attack resistance of APUFs. Compared with APUFs, RO PUFs can be configured on an FPGA more easily and has good performance. RO-PUFs generate information entropy by comparing frequencies of two randomly selected oscillator circuits. The entropy evaluation standard of such a circuit design is relatively simple, but the quantity of the information entropy is small, and the reliability of the information entropy may be affected by temperature. Lee et al. designed a leakage PUF circuit by means of the dependency of sub-threshold leakage current on changes of the threshold voltage of transistors to improve the output stability by remapping without reducing the challenge response pair (CRP) space. Taneja et al. designed a mono-stable PUF based on an adjustable cascode current mirror through an automated and digital design process, which has hysteresis characteristics and is robust against noise, voltage and temperature. However, in an application environment in which hardware resources such as IoT are extremely limited such as IoT, the hardware HPU cannot function effectively. Moreover, to adapt to the hardware PUF, devices have to be changed, which leads to an increase of design cost and time cost of products; and the hardware PUF cannot meet the requirements of some IoT systems, of which hardware devices cannot be changed.

Under normal operating conditions, chips function correctly; however, under abnormal operating conditions, the chips may function incorrectly, and feature information of the chips can be reflected by abnormal information, which provides an opportunity for the study of software PUFs (PUFs that generate output responses by means of a software program). The software PUFs (SPUFs) extract random process deviations of hardware according to abnormal information of equipment under abnormal conditions to establish a response relationship between the abnormal information and hardware features so as to obtain output response data of the PUFs, realize security application of the PUF circuit without changing the product design and existing hardware devices, provide a solution to high-security problems of extremely resource-limited systems, and guarantee the security of IoT development. In the design of software PUFs, Wang et al. proposed an MScanPUF by means of the uncertainty of sample data of a trigger in a timing violation to realize response acquisition of storage type PUFs. However, a multiplexer has to be added to an original scan chain structure, so the MScanPUF is high in security, but poor in stability. Maiti et al. proposed a processor PUF that generates PUF responses according to the difference of errors generated by repeated execution of an instruction by different chips at an excessive frequency. Such a PUF avoids exclusive hardware overheads, but it needs accurate changes of the frequency and repeated running of the instruction, so this PUF may suffer from side channel attacks and is poor in security and stability. Maiti et al. put forward a software PUF based on a *Camellia* encryption algorithm, which generates a timing violation by adjusting the operating frequency of chips; however, the cryptographic algorithm will increase the instability of data, so this software PUF is high in security, but poor in stability.

BRIEF SUMMARY OF THE INVENTION

The technical issue to be settled by the invention is to provide a software PUF based on an RISC-V processor for IoT security, which is high in security and stability.

The technical solution adopted by the invention to settle the above technical issue is as follows: a software PUF based on an RISC-V processor for IoT security comprises a 32-bit RISC-V processor, wherein a temperature sensor for monitoring an operating temperature of the 32-bit RISC-V processor and a voltage sensor for monitoring an operating voltage of the 32-bit RISC-V processor are configured in the 32-bit RISC-V processor, and the 32-bit RISC-V processor generates an output response through the following method:
  (1) randomly selecting, from R instructions, four groups of instructions and four groups of operands corresponding to the four groups of instructions, wherein the four groups of instructions are all 32-bit binary data, and the four groups of operands are all 64-bit binary data;
  (2) accessing a supply voltage to the 32-bit RISC-V processor, wherein the supply voltage is a normal operating voltage of the 32-bit RISC-V processor, and the 32-bit RISC-V processor enters a normal operating state under the normal operating voltage, and an operating frequency of the 32-bit RISC-V processor at this moment is a normal operating frequency; sequentially loading the four groups of operands to a general register with a load instruction, sorting the four groups of instructions in chronological order, sequentially running the four groups of instructions and the corresponding four groups of operands according to the sorting order to successively obtain four normal information results corresponding to the four groups of instructions, and storing the four normal information results in the general register, wherein the four normal information results are 32-bit binary data;

(3) decreasing the supply voltage accessed to the 32-bit RISC-V processor to 0.7V, wherein the supply voltage at this moment is an abnormal operating voltage of the 32-bit RISC-V processor, and the 32-bit RISC-V processor enters an abnormal operating state under the abnormal operating voltage;

(4) acquiring a current operating temperature of the 32-bit RISC-V processor from the temperature sensor, acquiring a current operating voltage of the 32-bit RISC-V processor from the voltage sensor, denoting the current operating temperature of the 32-bit RISC-V processor as $temp_{cur}$, denoting the current operating voltage of the 32-bit RISC-V processor as $V_{cur}$, and obtaining a compensatory operating frequency of the 32-bit RISC-V processor by calculation according to formula (1):

$$F_{com} = \frac{1}{\dfrac{1}{\dfrac{1}{\ln a_{temp}} \times (temp_{cur} - temp_{ref}) + \dfrac{1}{F_{ref}}} + \dfrac{1}{\ln a_{vdd} \times (V_{cur} - V_{ref}) + \dfrac{1}{F_{ref}}}} \quad (1)$$

In formula (1), $temp_{ref}$ is a reference temperature of the 32-bit RISC-V processor ($temp_{ref}$=25° C.), $V_{ref}$ is a reference voltage of the 32-bit RISC-V processor ($V_{ref}$=0.7V), $F_{ref}$ is the normal operating frequency of the 32-bit RISC-V processor, $F_{com}$ is the compensatory operating frequency of the 32-bit RISC-V processor, $a_{temp}$ is a temperature compensation coefficient of the 32-bit RISC-V processor and is determined by testing the fluctuation velocity of a delay of the 32-bit RISC-V processor with time under different temperatures, $a_{vdd}$ is a voltage compensation coefficient of the 32-bit RISC-V processor and is determined by testing the fluctuation velocity of the delay of the 32-bit RISC-V processor with voltage under different supply voltages, and ln is a logarithmic operator;

(5) setting the operating frequency of the 32-bit RISC-V processor as the compensatory operating frequency;

(6) loading the four groups of operands to the general register again with the load instruction, then sequentially running the four groups of instructions and the corresponding four groups of operands in chronological order the same as that in Step (2) to successively obtain four abnormal information results corresponding to the four groups of instructions, and storing the four abnormal information results in the general register, wherein the four abnormal information results are 32-bit binary data;

(7) bitwise comparing the normal information results and the abnormal information results corresponding to the four groups of instructions one by one to determine error bits of the abnormal information result corresponding to each group of instructions with respect to the normal information result corresponding to the group of instructions, calculating the number of the error bits, and then converting the number of the error bits into 5-bit binary data, so that four pieces of 5-bit binary data corresponding to the four groups of instructions are obtained; and (8) sequentially stitching the four pieces of 5-bit binary data from high bit to low bit according to a corresponding instruction running order to obtain 20-bit binary data, wherein the 20-bit binary data is the output response of the software PUF.

The four groups of instructions are add instructions, subtract instructions, multiply instructions and divide instructions.

Compared with the prior art, the invention has the following advantages: a 32-bit RISC-V processor is used to generate abnormal information results in an abnormal operating state under a low voltage, and the abnormal information results are used to represent the features of the 32-bit RISC-V processor, so that exclusive hardware overheads are avoided; 5-bit binary data obtained by comparing the abnormal information results with normal information results has high randomness and uniqueness and it is extremely difficult to directly extract internal abnormal information result from a hardware circuit of the 32-bit RISC-V processor, so modeling attacks based on the 5-bit binary data calculated according to the abnormal information results of the 32-bit RISC-V processor are almost impossible, and thus, the software PUF provided by the invention has high security. In addition, when the 32-bit RISC-V processor is in an abnormal operating state, the operating frequency of the 32-bit RISC-V processor is dynamically adjusted through a frequency compensation method, so the stability of output response data of the PUF is improved, and thus, the software PUF provided by the invention has good randomness and uniqueness and high security and stability, provides a solution to high-security problems of extremely resource-limited systems, and guarantees the security of IoT development.

DETAILED DESCRIPTION OF THE INVENTION

Figure 1:
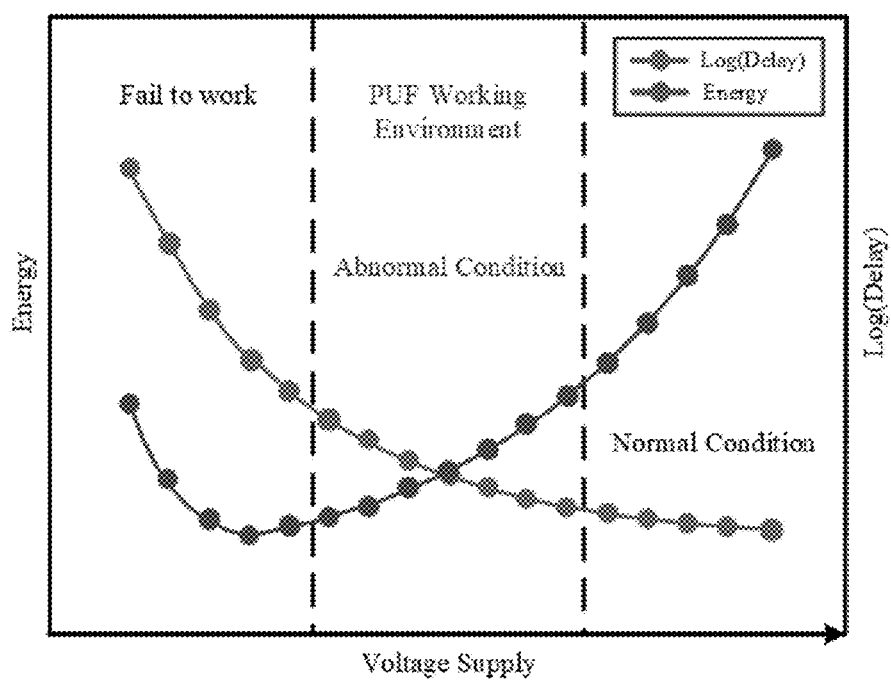
FIG. 1 is a schematic diagram of the operating states of a 32-bit RISC-V processor under different supply voltages.

The invention will be described in further detail below in conjunction with the accompanying drawings and embodiments.

Embodiment: A software PUF based on an RISC-V processor for IoT security comprises a 32-bit RISC-V processor, wherein a temperature sensor for monitoring the operating temperature of the 32-bit RISC-V processor and a voltage sensor for monitoring the operating voltage of the 32-bit RISC-V processor are configured in the 32-bit RISC-V processor, and the 32-bit RISC-V processor generates an output response through the following method:

(1) randomly selecting, from R instructions, four groups of instructions and four groups of operands corresponding to the four groups of instructions, wherein the four groups of instructions are all 32-bit binary data, and the four groups of operands are all 64-bit binary data;

(2) accessing a supply voltage to the 32-bit RISC-V processor, wherein the supply voltage is a normal operating voltage of the 32-bit RISC-V processor, and the 32-bit RISC-V processor enters a normal operating state under the normal operating voltage, and the operating frequency of the 32-bit RISC-V processor at this moment is a normal operating frequency; sequentially loading the four groups of operands to a general register with a load instruction, sorting the four groups of instructions in chronological order (preset), sequentially running the four groups of instructions and the corresponding four groups of operands according to the sorting order to successively obtain four normal information results corresponding to the four groups of instructions, and storing the four normal information results in the general register, wherein the four normal information results are 32-bit binary data;

(3) decreasing the supply voltage accessed to the 32-bit RISC-V processor to 0.7V, wherein the supply voltage at this moment is an abnormal operating voltage of the 32-bit RISC-V processor, and the 32-bit RISC-V processor enters an abnormal operating state under the abnormal operating voltage;

(4) acquiring a current operating temperature of the 32-bit RISC-V processor from the temperature sensor, acquiring a current operating voltage of the 32-bit RISC-V processor from the voltage sensor, denoting the current operating temperature of the 32-bit RISC-V processor as $temp_{cur}$, denoting the current operating voltage of the 32-bit RISC-V processor as $V_{cur}$, and obtaining a compensatory operating frequency of the 32-bit RISC-V processor by calculation according to formula (1):

$$F_{com} = \cfrac{1}{\cfrac{1}{\ln a_{temp}} \times (temp_{cur} - temp_{ref}) + \cfrac{1}{F_{ref}}} + \cfrac{1}{\ln a_{vdd} \times (V_{cur} - V_{ref}) + \cfrac{1}{F_{ref}}} \quad (1)$$

In formula (1), $temp_{ref}$ is a reference temperature of the 32-bit RISC-V processor (($temp_{ref}=25°$ C.), $V_{ref}$ is a reference voltage of the 32-bit RISC-V processor ($V_{ref}=0.7V$), $F_{ref}$ is the normal operating frequency of the 32-bit RISC-V processor, $F_{com}$ is the compensatory operating frequency of the 32-bit RISC-V processor, $a_{temp}$ is a temperature compensation coefficient of the 32-bit RISC-V processor and is determined by testing the fluctuation velocity of a delay of the 32-bit RISC-V processor with time under different temperatures, $a_{vdd}$ is a voltage compensation coefficient of the 32-bit RISC-V processor and is determined by testing the fluctuation velocity of the delay of the 32-bit RISC-V processor with voltage under different supply voltages, and In is a logarithmic operator;

(5) setting the operating frequency of the 32-bit RISC-V processor as the compensatory operating frequency;

(6) loading the four groups of operands to the general register again with the load instruction, then sequentially running the four groups of instructions and the corresponding four groups of operands in chronological order the same as that in Step (2) to successively obtain four abnormal information results corresponding to the four groups of instructions, and storing the four abnormal information results in the general register, wherein the four abnormal information results are 32-bit binary data;

(7) bitwise comparing the normal information results and the abnormal information results corresponding to the four groups of instructions one by one to determine error bits of the abnormal information result corresponding to each group of instructions with respect to the normal information result corresponding to the group of instructions, calculating the number of the error bits, and then converting the number of the error bits into 5-bit binary data, so that four pieces of 5-bit binary data corresponding to the four groups of instructions are obtained; and (8) sequentially stitching the four pieces of 5-bit binary data from high bit to low bit according to a corresponding instruction running order to obtain 20-bit binary data, wherein the 20-bit binary data is an output response of the software PUF.

In this embodiment, the four groups of instructions are add instructions, subtract instructions, multiply instructions and divide instructions.

An RISC-V instruction is used to activate a path of the 32-bit RISC-V processor, and abnormal information of the 32-bit RISC-V processor under an abnormal operating condition is obtained by decreasing the supply voltage and adjusting the operating frequency of the 32-bit RISC-V processor. The operating states of the 32-bit RISC-V processor under different supply voltages are shown in FIG. 1. As can be known by analyzing FIG. 1, the 32-bit RISC-V processor may be in three different operating states under different supply voltages: normal state, abnormal state, and non-operating state. In the normal state, the 32-bit RISC-V processor has a small path delay and high power consumption, a timing violation will not occur when the instructions are executed, and no abnormal information will be generated. When the process is in the non-operating state, the instructions will not be executed, and the 32-bit RISC-V processor has a maximum path delay and high power consumption due to the existence of leakage current, so the output response of the soft PUF is generated in the gray area (abnormal state) in FIG. 1, a timing violation of RISC-V instructions occurs on the path in the 32-bit RISC-V processor, the 32-bit RISC-V processor has low power consumption and a large path delay, and abnormal information results with the features of the RISC-V processor are generated.

The randomness of the PUF is generally visually evaluated by information entropy. The output of the PUF has two states: logic 1 and logic 1. So, the information entropy E may be expressed as:

$$E = -\sum_{r=0}^{1} p(r) \log_2 p(r) \quad (2)$$

Figure 2:
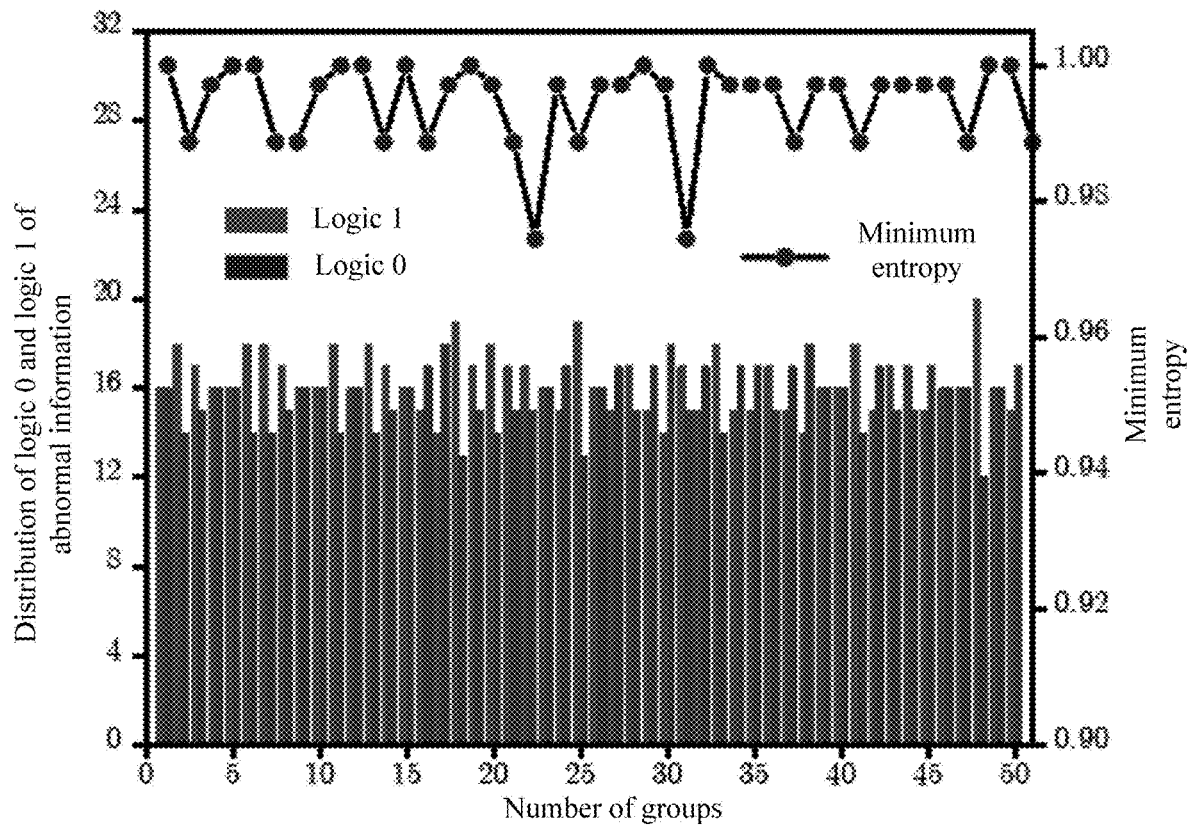
FIG. 2 is an entropy distribution diagram of output responses of 50 software PUFs.

In formula (2), p(r=0) and p(r=1) respectively represent the probability of logic 0 and the probability of logic 1 of an output. When and only when p(r=0)=p(r=1)=0.5, E=1. To further study the influence of random processing on output responses, Monte Carlo emulation is performed 50 times under a voltage of 0.7V to simulate random process deviations of 50 32-bit RISC-V processors, and output responses of 50 software PUFs are recorded. Wherein, the entropy distribution of the output responses of the 50 software PUFs is shown in FIG. 2. It can be known by analyzing FIG. 2 that the information entropy of the output response of the software PUFs is greater than 0.97, which indicates that the output responses of the software PUF of the invention have extremely good randomness. The proportion of logic 0 and the proportion of logic 1 in the output responses are 50.41% and 49.59% respectively, and the corresponding randomness is 99.18%, which is close to the ideal value 100%, indicating that there is no obvious logic bias.

The uniqueness refers to the capacity to obtain process deviations of the PUF and is used to identify the difference between different software PUFs. The uniqueness of the software PUF of the invention is evaluated by calculating the Hamming distance (HD) between output responses of different PUFs of the same type. The uniqueness represents the average inter-chip HD of K different software PUFs, and may be expressed as:

$$\text{Uniqueness} = \frac{2}{k(k-1)} \sum_{i=1}^{k-1} \sum_{j=i+1}^{k} \frac{HD(r_i, r_j)}{n} \times 100\% \quad (3)$$

Figure 3:
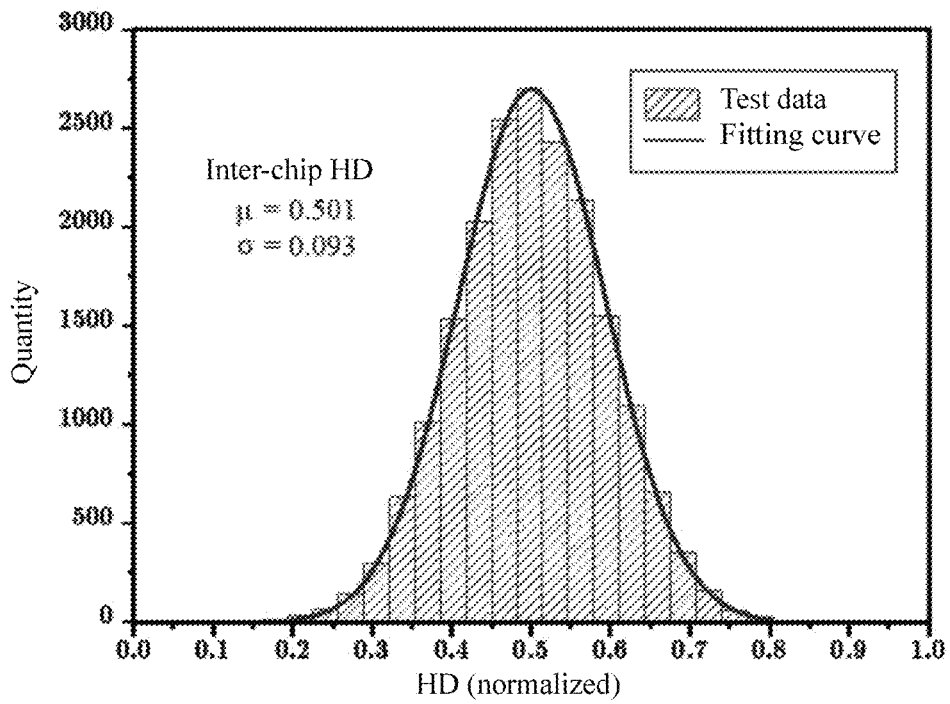
FIG. 3 illustrates a statistical histogram and a fitting curve of the average HD of a software PUF according to the invention.

In formula (3), k is the number of the software PUFs, $R_i$ and $R_j$ are the output response of the $i^{th}$ software PUF and the output response of the $j^{th}$ software PUF, and $HD(R_i, R_j)$ is the HD between the $i^{th}$ software PUF and the $j^{th}$ software PUF. By calculation according to formula (3), the uniqueness of the output responses of the software PUFs is 50.1%, which is close to the ideal value 50%, indicating that data of the software PUFs is completely free of biases. As can be seen from FIG. 3 which illustrates the statistical histogram (including the fitting curve) of the average HD of the software PUF of the invention, the HD distribution of output responses obtained by 6,000 times of Monte Carlo emulation is a normal distribution meeting the mathematical expectation μ=0.5010 and the standard difference σ=0.093.

The security means that it is hardly possible for an attacker to predict PUF responses corresponding to new challenges by means of previous CRPs or CRPs of other PUFs. Generally, the security of the software PUF of the invention is evaluated with the NIST SP800-22 test suite and the auto-correlation test.

1. NIST test: the NIST statistical test suite is used to evaluate the randomness of encryption applications and pseudo-random numbers. 51,200 random response sequences generated by a test chip are used as inputs of NIST, and these inputs are divided into 50 individual bit streams and are subjected to different NIST tests. Table 1 shows the results of the output responses of the software PUF tested with NIST. The P values of the generated bit streams are all greater than 0.01, and the sequences pass all the tests. Specific test data is shown in Table 1.

TABLE 1

| NIST Test | | | | |
|---|---|---|---|---|
| NIST Test Name | Stream | Run No. | P value | Pass |
| Frequency | 1024 | 50 | 0.3815 | 100 |
| Block Frequency | 1024 | 50 | 0.9782 | 100 |
| Runs | 1024 | 50 | 0.4301 | 100 |
| Rank | 1024 | 50 | 0.3018 | 100 |
| Longest Runs | 1024 | 50 | 0.5241 | 100 |
| FFT | 1024 | 50 | 0.7439 | 100 |
| Cumulative | 1024 | 50 | 0.5864 | 100 |

TABLE 1-continued

| NIST Test | | | | |
|---|---|---|---|---|
| NIST Test Name | Stream | Run No. | P value | Pass |
| Sums | | | | |
| Non-overlapping | 1024 | 50 | 0.7921 | 100 |
| Overlapping Template | 1024 | 50 | 0.4276 | 100 |
| Serial | 1024 | 50 | 0.1254 | 100 |
| Approximate Entropy | 1024 | 50 | 0.4393 | 100 |

Figure 4:
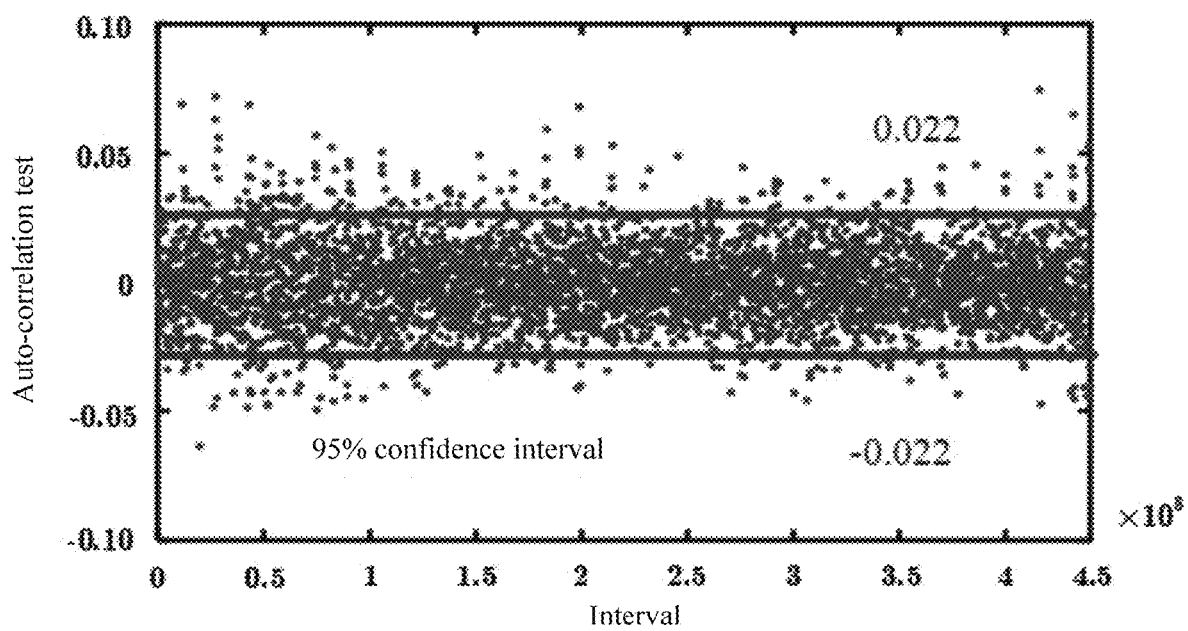
FIG. 4 illustrates the auto-correlation result of an output response of the software PUF according to the invention.

2. Auto-correlation test: the auto-correlation test describes the degree of correlation between a current value and a previous value of the random response sequences to determine whether the tested PUF can generate independent numbers with the same distribution in the sequences. The software PUF of the invention is tested by evaluating the auto-correlation of a 4500-bit output response of the software PUF. The auto-correlation result of the output response of the software PUF is shown in FIG. 4. In FIG. 4, the auto-correlation test value is 0, indicating that the generated response sequence has no spatial correlation. The test result shows that, within a 95% confidence interval, the auto-correlation test value of the software PUF is 0.022, which is close to the ideal value 0.

Figure 5:
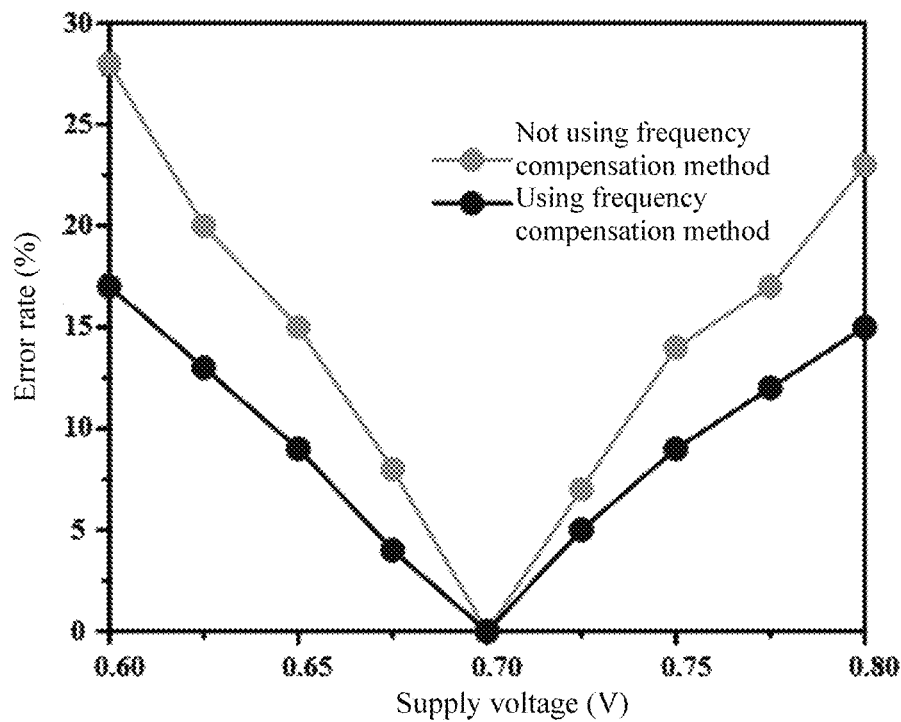
FIG. 5 illustrates error rates of the software PUF under different supply voltages according to the invention.
Figure 6:
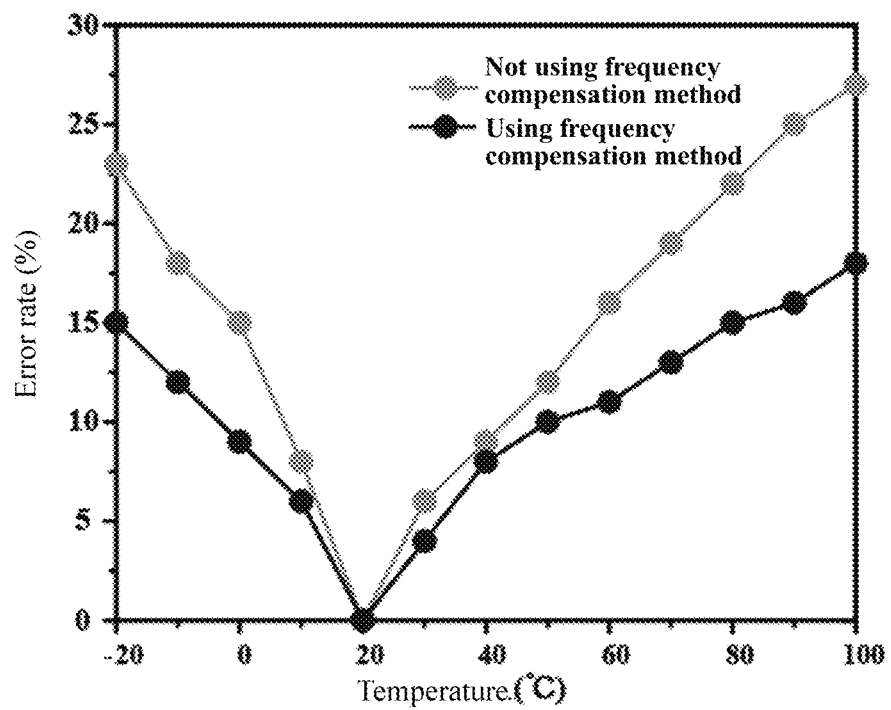
FIG. 6 illustrates error rates of the software PUF under different temperatures according to the invention.

System noise and changes of supply voltage and temperature will lead to a decline of the stability of the PUF. To evaluate the effectiveness of the frequency compensation method of the invention, the error rate of output response data of 50 software PUFs calibrated with the frequency compensation method and the error rate of output response data of 50 software PUFs not calibrated with the frequency compensation method under different voltages are tested. The error rates of the software PUF under different supply voltages are shown in FIG. 5. In FIG. 5, under a nominal condition (0.7V and 20° C.), the maximum error rate of the software PUFs not calibrated with the frequency compensation method is 28%, and the maximum error rate of the software PUFs calibrated with the frequency compensation method is 16%, indicating that the error rate is decreased by 1.75 times through the frequency compensation method of the invention. To evaluate the reliability of the software PUF under different temperatures before and after calibration, the software PUF of the invention is tested within a large temperature range. The error rate of the software PUF of the invention under different temperatures is shown in FIG. 6. As can be known by analyzing FIG. 6, within a temperature range from −20° C. to 100° C., the maximum error rate before calibration is 27%, the minimum error rate is decreased to 17% after frequency compensation, providing that the frequency compensation method of the invention is effective.

What is claimed is:

1. A software PUF based on an RISC-V processor for IoT security, characterized in that comprises a 32-bit RISC-V processor, wherein a temperature sensor for monitoring an operating temperature of the 32-bit RISC-V processor and a voltage sensor for monitoring an operating voltage of the 32-bit RISC-V processor are configured in the 32-bit RISC-V processor, and the 32-bit RISC-V processor generates an output response through the following method:

(1) randomly selecting, from R instructions, four groups of instructions and four groups of operands corresponding to the four groups of instructions, wherein the four groups of instructions are all 32-bit binary data, and the four groups of operands are all 64-bit binary data;

(2) accessing a supply voltage to the 32-bit RISC-V processor, wherein the supply voltage is a normal operating voltage of the 32-bit RISC-V processor, and the 32-bit RISC-V processor enters a normal operating state under the normal operating voltage, and an operating frequency of the 32-bit RISC-V processor at this moment is a normal operating frequency; sequentially loading the four groups of operands to a general register with a load instruction, sorting the four groups of instructions in chronological order, sequentially running the four groups of instructions and the corresponding four groups of operands according to the sorting order to successively obtain four normal information results corresponding to the four groups of instructions, and storing the four normal information results in the general register, wherein the four normal information results are 32-bit binary data;

(3) decreasing the supply voltage accessed to the 32-bit RISC-V processor to 0.7V, wherein the supply voltage at this moment is an abnormal operating voltage of the 32-bit RISC-V processor, and the 32-bit RISC-V processor enters an abnormal operating state under the abnormal operating voltage;

(4) acquiring a current operating temperature of the 32-bit RISC-V processor from the temperature sensor, acquiring a current operating voltage of the 32-bit RISC-V processor from the voltage sensor, denoting the current operating temperature of the 32-bit RISC-V processor as $temp_{cur}$, denoting the current operating voltage of the 32-bit RISC-V processor as $V_{cur}$, and obtaining a compensatory operating frequency of the 32-bit RISC-V processor by calculation according to formula (1):

$$F_{com} = \cfrac{1}{\cfrac{1}{\ln a_{temp}} \times (temp_{cur} - temp_{ref}) + \cfrac{1}{F_{ref}}} + \cfrac{1}{\ln a_{vdd} \times (V_{cur} - V_{ref}) + \cfrac{1}{F_{ref}}} \quad (1)$$

In formula (1), $temp_{ref}$ is a reference temperature of the 32-bit RISC-V processor ($temp_{ref}=25°$ C.), $V_{ref}$ is a reference voltage of the 32-bit RISC-V processor ($V_{ref}=0.7V$), $F_{ref}$ is the normal operating frequency of the 32-bit RISC-V processor, $F_{com}$ is the compensatory operating frequency of the 32-bit RISC-V processor, $a_{temp}$ is a temperature compensation coefficient of the 32-bit RISC-V processor and is determined by testing the fluctuation velocity of a delay of the 32-bit RISC-V processor with time under different temperatures, $a_{vdd}$ is a voltage compensation coefficient of the 32-bit RISC-V processor and is determined by testing the fluctuation velocity of the delay of the 32-bit RISC-V processor with voltage under different supply voltages, and ln is a logarithmic operator;

(5) setting the operating frequency of the 32-bit RISC-V processor as the compensatory operating frequency;

(6) loading the four groups of operands to the general register again with the load instruction, then sequentially running the four groups of instructions and the corresponding four groups of operands in chronological order the same as that in Step (2) to successively obtain four abnormal information results corresponding to the four groups of instructions, and storing the four abnormal information results in the general register, wherein the four abnormal information results are 32-bit binary data;

(7) bitwise comparing the normal information results and the abnormal information results corresponding to the four groups of instructions one by one to determine error bits of the abnormal information result corresponding to each group of instructions with respect to the normal information result corresponding to the group of instructions, calculating the number of the error bits, and then converting the number of the error bits into 5-bit binary data, so that four pieces of 5-bit binary data corresponding to the four groups of instructions are obtained; and (8) sequentially stitching the four pieces of 5-bit binary data from high bit to low bit according to a corresponding instruction running order to obtain 20-bit binary data, wherein the 20-bit binary data is the output response of the software PUF.

2. The software PUF according to claim 1, wherein the four groups of instructions are add instructions, subtract instructions, multiply instructions and divide instructions.

* * * * *